(12) United States Patent
Barneson et al.

(10) Patent No.: US 9,241,321 B2
(45) Date of Patent: Jan. 19, 2016

(54) PRIVACY-HARDENED GEOLOCATION SYSTEM

(71) Applicant: SOLOMO IDENTITY, LLC., Madison, WI (US)

(72) Inventors: Joe Barneson, Madison, WI (US); Kyle McFarlane, Madison, WI (US); Christopher W. Kelly, Madison, WI (US)

(73) Assignee: Solomo Identity, LLC, Madison, WI (US)

( * ) Notice: Subject to any disclaimer, the term of this patent is extended or adjusted under 35 U.S.C. 154(b) by 260 days.

(21) Appl. No.: 13/959,908

(22) Filed: Aug. 6, 2013

(65) Prior Publication Data

US 2015/0045053 A1  Feb. 12, 2015

(51) Int. Cl.
*H04W 24/00* (2009.01)
*H04W 64/00* (2009.01)
*G01S 5/00* (2006.01)
*H04W 12/02* (2009.01)

(52) U.S. Cl.
CPC .............. *H04W 64/00* (2013.01); *G01S 5/00* (2013.01); *H04W 12/02* (2013.01)

(58) Field of Classification Search
CPC ......... H04W 64/00; H04W 12/02; G01S 5/00
USPC ............ 455/456.1; 370/254, 328; 726/28, 30; 705/40
See application file for complete search history.

(56) References Cited

U.S. PATENT DOCUMENTS

| 2004/0190460 A1* | 9/2004 | Gaskill .......................... 370/254 |
| 2008/0080415 A1* | 4/2008 | Stephenson et al. .......... 370/328 |
| 2010/0024045 A1* | 1/2010 | Sastry et al. .................... 726/28 |
| 2013/0198065 A1* | 8/2013 | McPherson ......... H04L 61/1511 705/40 |

* cited by examiner

*Primary Examiner* — David Q Nguyen
(74) *Attorney, Agent, or Firm* — Boyle Fredrickson, S.C.

(57) ABSTRACT

A lightweight, wireless geolocation node monitors mobile wireless devices for the purpose of the geolocation and has restricted functionality to better preserve privacy information. MAC addresses acquired from probe signals of mobile wireless devices may be one-way encrypted before being transmitted from the node. Reduced transmission strength may be used for localized transmission without consumer tracking.

14 Claims, 5 Drawing Sheets

PRIVACY-HARDENED GEOLOCATION SYSTEM

STATEMENT REGARDING FEDERALLY SPONSORED RESEARCH OR DEVELOPMENT

Not Applicable

CROSS REFERENCE TO RELATED APPLICATION

Not Applicable

BACKGROUND OF THE INVENTION

The present invention relates to systems for identifying the location of mobile transmitters such as cell phones/tablets and in particular to a geolocation system that provides improved privacy to the consumers using mobile transmitters in a geolocation area.

Geolocation systems allow approximate tracking of the location of mobile wireless devices in an environment for any location where GPS signals are unavailable, weak, or in need of augmentation. Such systems may be used, for example, to locate critical personnel (such as medical personnel in a hospital or airline workers in an airport) or may be used to provide additional services to consumers in a retail environment including navigation or localized promotions such as coupons.

Geolocation can be implemented using the wireless access points and routers also used to establish a local area wireless network communicating with such mobile wireless devices, for example, using the IEEE 802.11 standard. By measuring the signal strength, signal phase and/or reception angle of wireless data communicated between a mobile wireless device and multiple access points, the location of the mobile wireless device may be established by signal-based location.

While geolocation can provide substantial benefits to consumers and other individuals, unauthorized tracking runs counter to a consumers' desire to control data about themselves. In particular, consumers can worry about systems that uniquely identify their wireless devices in a way that may allow aggregation with other information obtained from the wireless device.

SUMMARY OF THE INVENTION

The present invention provides a node for geolocation constructed to better ensure that mobile device data is not processed, for example for geolocation, before it is properly anonymized, for example, by one-way hashing. The node works with downstream servers allowing the consumer to control his or her data allowing for no tracking, anonymous tracking, or personalized tracking as desired. In one embodiment, the node provides a localized experience for users of mobile wireless devices without the need for tracking.

Specifically, in one embodiment, the invention provides for a simplified geolocation node having a Wireless receiver and a processor executing a stored program to receive via the wireless receiver wireless signals from local mobile wireless devices and record a wireless signal strength of each received signal linked to an identification of the local mobile wireless device. The processor further provides one-way encryption of the identification of the local mobile wireless device and transmits the linked wireless signal strength and encrypted identification of the given mobile wireless device over a network connection to a signal-based location computer.

It is thus a feature of at least one embodiment of the invention to increase consumer privacy by encrypting device specific information at the earliest point of acquisition in a geolocation system.

The identification of the local mobile wireless device may be a media access control (MAC) address.

It is thus a feature of at least one embodiment of the invention to protect information that is not personally identifiable on its own but could be linked to personally identifiable information, thereby becoming personal.

The program may further overwrite the identification of the local mobile wireless device after one-way encryption of the identification of the local mobile wireless device.

It is thus a feature of at least one embodiment of the invention to limit the potential for security breaches from malware or brute force attacks on the node.

The geolocation node may be functionally blocked from transmitting unencrypted identification of the local mobile wireless device.

It is thus a feature of at least one embodiment of the invention to provide early upstream one-way encryption to largely eliminate concerns about possible eavesdropping or downstream devices misusing device identification information.

The program stores may store the MAC address data for processing only in volatile memory.

It is thus a feature of at least one embodiment of the invention to provide additional security against improper discovery of the MAC addresses by decreasing their potential storage lifetime.

The geolocation node may include an electrical connector for receiving line voltage AC from a releasable AC power connector wherein the AC power connector physically supports the geolocation node on the releasable AC power connector. The electrical connector may be one that is adapted to connect to a releasable AC power connector and is selected from the group consisting of an electrical outlet and a light socket.

It is thus a feature of at least one embodiment of the invention to provide a geolocation node that may be easily installed in existing locations with reduced wiring.

The geolocation node may include a housing openable for access to the processor and provide an electrical connector for receiving electrical power for the processor, and the housing may be adapted to open only when the electrical connector is disconnected from electrical power.

It is thus a feature of at least one embodiment of the invention to promote erasure of volatile memory in the event of tampering with the geolocation node.

The stored program may be functionally blocked from storing wireless payload data received from the local mobile wireless device. Additionally, in one embodiment, the geolocation node may be put into a mode that can only receive data, thus association required for a data frame to be received would not occur.

It is thus a feature of at least one embodiment of the invention to enhance security by providing a limited function device.

The present invention may also provide a geolocation system having a first wireless network system of a first number of spatially separated first wireless transceivers with a first functionality, the first wireless network providing data exchange with mobile wireless devices in a first connectivity area. This first wireless network may be supplemented with a second wireless network system of a second number of spatially separated second wireless receivers greater than the first number of spatially separated first wireless transceivers having a second functionality omitting functions of the first functionality, the second wireless network providing data reception from mobile wireless devices in a first connectivity area.

It is thus a feature of at least one embodiment of the invention to provide a low-cost supplemental network for geolocation purposes, for example, to provide greater security and/or greater coverage overlap for better geolocation. Simple dedicated geolocation nodes eliminate the need for redundant overlapping coverage by general-purpose wireless routers and allow low-cost implementation of geolocation in areas where wireless routers were not originally intended for geolocation and thus exhibit little overlap.

The second wireless network may provide data exchange with mobile devices substantially only in the first connectivity area.

It is thus a feature of at least one embodiment of the invention to improve geolocation in existing wireless coverage areas by creation of a redundant network.

The second wireless receivers may further include transmitters providing data transmission to mobile wireless devices in the first connectivity area over a combined transmission area substantially less than the first connectivity area.

It is thus a feature of at least one embodiment of the invention to permit communication with mobile wireless devices specific to a particular location even without geolocation.

The second wireless receivers may communicate wirelessly with each other, thus permitting one of them to act as a single point of connection to a router thereby eliminating the need to run standard Ethernet cables to each receiver.

It is thus a feature of at least one embodiment of the invention to enable communication between receivers such that only AC power is required to be provided to each receiver and standard Ethernet cable is not required.

The transmission areas of the transmitters of the second wireless receivers may be substantially disjoint.

It is thus a feature of at least one embodiment of the invention to provide improved selectivity for transmission-range limited wireless communication when used for localized promotion.

These particular objects and advantages may apply to only some embodiments falling within the claims and thus do not define the scope of the invention.

DETAILED DESCRIPTION OF THE PREFERRED EMBODIMENT

Figure 1:
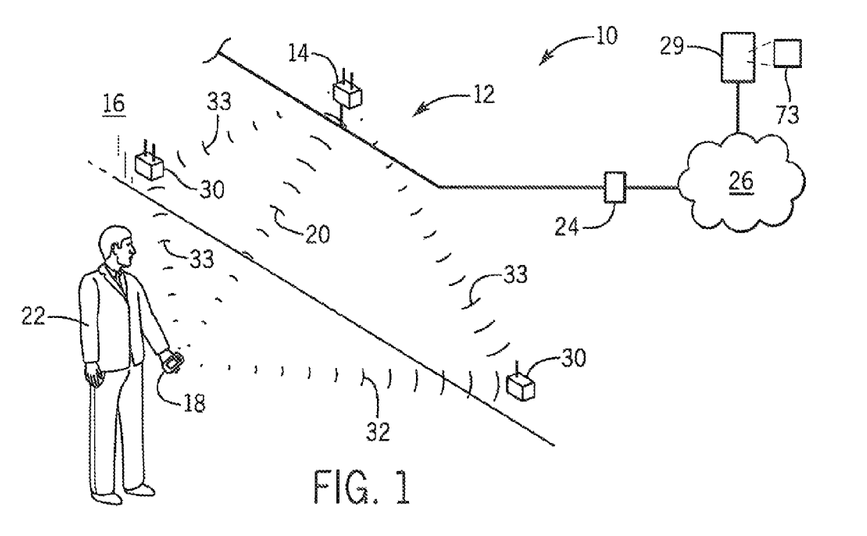
FIG. 1 is a simplified perspective view of a geolocation system of the present invention in the environment of a wireless network showing multiple geolocation nodes working with a standard wireless router.

Referring now to FIG. 1, a privacy-enhanced geolocation system 10 of the present invention may work with a standard wireless network 12 having, for example, multiple wireless access points or routers 14 distributed throughout a wireless network area 16. The wireless routers 14 may connect to portable mobile wireless devices 18 such as cell phones or tablet computers through radio signals 20, for example, using the IEEE 801.11 (Wi-Fi) protocol.

In this regard, multiple wireless routers 14 may be positioned in the wireless network area 16 to provide a wireless network 12 providing substantially continuous coverage of mobile wireless devices 18 within that region and may be interconnected by a wireless network 12 such as may be implemented in one example with standard Ethernet cabling. This interconnection allows multiple wireless routers 14 to integrate in a wireless mobility group allowing an individual 22 of the mobile wireless device 18 to move seamlessly between coverage areas of different routers 14. The wireless network 12 may ultimately connect to an access device 24 such as a cable modem with the Internet 26 thus providing a gateway to the Internet 26 for mobile wireless devices 18.

Typically, a wireless router 14 provides a transceiver that may operate on multiple frequencies under the control of an internal computer that handles a wireless communication protocol allowing data transfer to and from the mobile wireless devices 18. The wireless router 14 may also provide routing that allows data transmissions to be properly communicated to different mobile wireless devices 18 according to a contained routing table using methods well known in the art.

The present invention may supplement wireless routers 14 and the wireless network 12 created with these wireless routers 14 with multiple, limited function geolocation nodes 30. The geolocation nodes 30, in some embodiments, may communicate wirelessly with the wireless routers 14 by radio signals 33 thereby communicating through the Internet 26 with a server 29. In all embodiments, the geolocation nodes 30 may receive radio signals 33 from mobile wireless devices 18 for the purpose of acquiring geolocation data. In some embodiments, the geolocation nodes 30 may also transmit data to the mobile wireless devices, but generally the geolocation nodes 30 will provide for reduced and/or different functionality than that provided by a wireless router 14 or a typical wireless access point.

In particular, the limited function geolocation nodes 30 will typically not provide routing capabilities and may provide for reduced or no transmission capabilities for wireless communication with the mobile wireless devices 18, and where transmission capabilities are provided reduced transmission power and hence range with respect to communicating with the mobile wireless devices 18. When no wireless transmission capabilities are provided, the geolocation nodes 30 may provide a communication stack insufficient for full data communication with the mobile wireless devices 18.

In some embodiments, the geolocation nodes 30 may provide for additional hardware and software features providing enhanced privacy protections as will be described below, for example software features that limit the storage and transmission of sensitive data and hardware features that resists hardware access to sensitive data. In addition the geolocation nodes 30 may provide features that reduce manufacturing and installation costs as will also be described.

Figure 2:
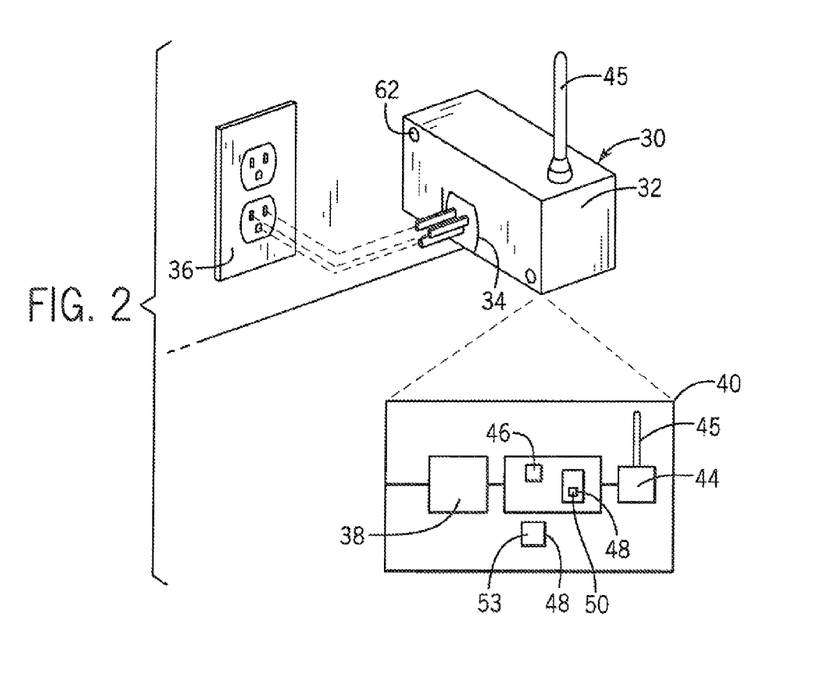
FIG. 2 is an exploded perspective view of a geolocation node of the present invention as may be attached to a standard wall outlet and showing an internal block diagram of its components including an electronic computer.

Referring now to FIG. 2, in one embodiment, the geolocation node 30 may provide for a compact housing 32 providing a standard electrical power plug 34 on its rear surface that may be received by a standard electrical outlet socket 36 to wholly support and power the geolocation node 30. In an alternative embodiment (not depicted) the electrical power plug 34 may be replaced with a screw-type lamp connector allowing the geolocation node 30 to receive power and be supported by a lamp fixture. In this embodiment, a secondary lamp socket may be provided to pass power also through to a bulb or other light source. In other embodiments, power sources may include batteries, standard AC power cords, solar panels, Power over Ethernet, or Ethernet over Power.

The housing 32 may hold a power processing circuit 38 converting 110 volt nominal AC voltage to a low voltage DC voltage (e.g. five volt) used to provide power to a low-cost computer 40 such as the Raspberry Pi (commercially available through the Raspberry Pi Foundation of the United Kingdom) or similar microprocessor system. The computer 40 may in turn be attached to a Wi-Fi transceiver 44, for example, as a plug-in dongle and available from a variety of commercial sources, providing low-level Wi-Fi 802.11 protocol and communicating with an antenna 45 that may project through the housing 32.

The computer 40, as is understood in the art, may include a processor 46 communicating with a memory 48 holding one or more stored programs 50 including an operating system, for example a lightweight Linux kernel, and specialized geolocation programming of the present invention as will be described. In one embodiment, the memory 48 holding a stored programs 50 may be read only and/or digitally signed memory preventing any corruption by malware or the like. More generally, the memory 48 may, for example, be a combination of nonvolatile flash memory 53 and random access memory 54, the latter including, for example, registers of the processor 46.

Figure 3:
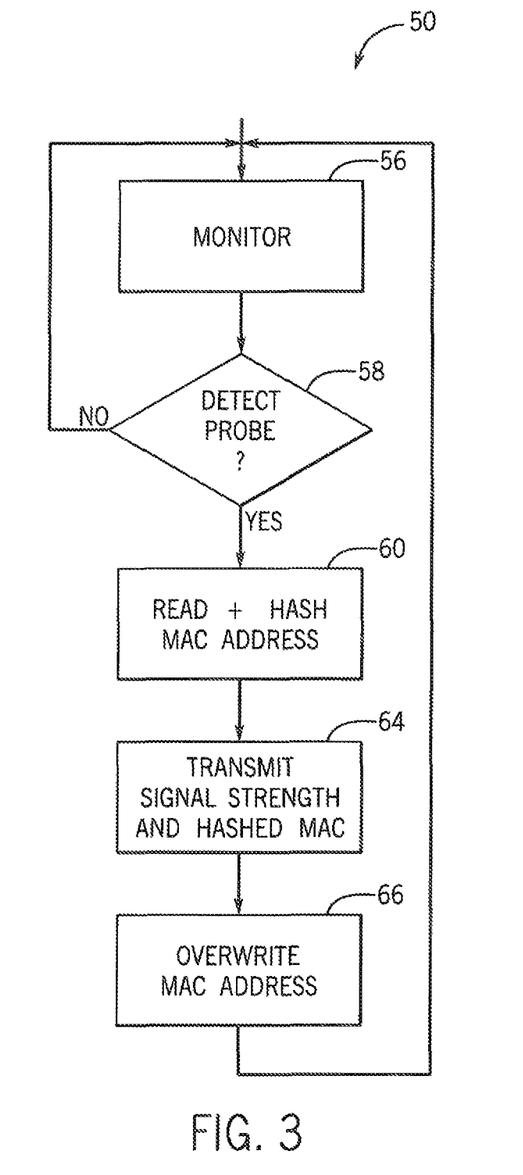
FIG. 3 is a flowchart of the program executed on the electronic computer of FIG. 2 for providing privacy-hardened geolocation.

Referring now to FIGS. 1, 2 and 3, the program 50 may operate to monitor the signals from the Wi-Fi transceiver 44 as indicated by process block 56 to detect probe signals from mobile wireless devices 18. If a probe signal is detected, as indicated by decision block 58, the signal strength of the probe signal is measured and that measurement linked to the MAC address of the mobile wireless device 18 at process block 60. It will be appreciated that the signal strength value may be alternatively any other value useful for multilateration or multiangulation (henceforth collectively signal-based location) including, for example, signal phase and/or reception angle.

While the link MAC address in itself does not provide personal information about the individual 22, there may be personal information of the individual 22 linked to MAC addresses in other contexts or databases outside of the geolocation system 10 and for this reason the MAC address is hashed for privacy with a one-way hash at process block 60. As is understood in the art, a one-way hash is a one-way function that is easy to compute in a forward direction (converting the MAC address to the hash) but practically impossible to invert (computing the MAC address from the hash) even if the function is known. After one-way hashing, mobile wireless device 18 is no longer identifiable although, to signals from a given mobile wireless device, 18 may be linked to a common but unidentified mobile wireless device 18. In addition, the hashing may use a "salt" value unique to a specific location or customer.

At process block 60, the MAC address and the hash of the MAC address are stored only in random access portions of memory 48 so as to be volatile in the event that power is lost to the computer 40. This power loss can be triggered in the event of disassembly of the geolocation node 30 by providing access screws 62 that must be removed for opening the housing 32 on a rear face of the housing 32 so that the housing 32 must be unplugged from the electrical power plug 34 before access can be obtained to the computer 40.

At process block 64, the linked one-way hash of the MAC address and the signal strength (or other signal-based location parameter) may be transmitted to a remote device such as the server 29. Note that it is not expected that the server 29 will be able to extract the MAC address after the one-way hashing (it is intended that that extraction cannot be performed by any downstream device) and thus generally, the MAC address will not be known by the server 29. Yet, the one-way hash allows the linking by the server 29 of two or more different signal strengths transmitted by different geolocation nodes based on the common one-way hash. This linking permits signal-based location without the risk of revealing information that could lead to the identification of personal information about the individual 22 through external information linking MAC addresses to that personal information. The transmission of the linked one-way hash of the MAC address and the signal strength may occur wirelessly by means of radio signals 33 between the limited function geolocation node 30 and the router 14 with confidence that the MAC address is fully encrypted. It will be appreciated that wireless encryption, SSL connections, and/or a wired connection may alternatively be used.

At process block 66, after transmission of the encrypted MAC address, an overwriting process is performed in main memory as well as on the registers in random access memory holding the MAC address and its encrypted form to reduce risk that this information would otherwise be transmitted or obtainable. The limited programming of the geolocation node 30 includes no steps to transmit the MAC address without encryption under any program execution paths.

Figure 4:
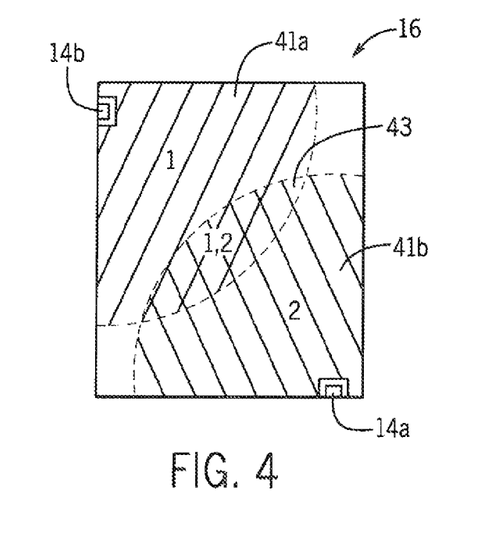
FIG. 4 is a simplified plan view of a geolocation area showing wireless router reception coverage.

Referring now to FIG. 4, wireless routers 14a and 14b may each provide a coverage area 40a (also labeled as 1) and 40b (also labeled as 2) respectively, having overlapping regions 43. Efficient coverage of wireless network area 16 for wireless transmission normally limits the amount of overlapping regions 43 so as to reduce interference and the cost of the wireless routers 14. When a geolocation system is desired using existing wireless routers 14, the accuracy of the signal-based location is reduced in areas outside of the overlap region 43 and limited even in the overlap region 43 by the existence, typically, of only two signal strength measurements (or signal phase measurements or the like).

Figure 5:
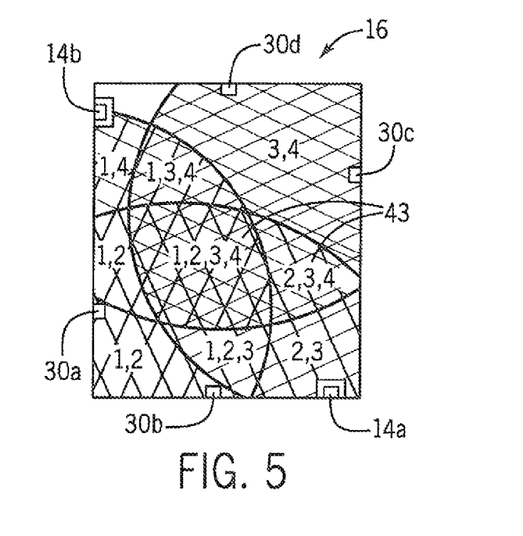
FIG. 5 is a figure similar to that of FIG. 4 showing geolocation node reception coverage providing greater redundancy.

In contrast, and as shown in FIG. 5, many more limited function geolocation nodes 30a-30d may be deployed in a given area at low cost and may provide for a far larger set of overlapping regions 43. Thus, although the geolocation nodes 30 overlap with capabilities that could be provided by the wireless routers 14 (and thus can be seen as redundant) they can provide a highly cost efficient method of building a high accuracy geolocation system in an area already served by wireless routers 14 or where additional wireless routers 14 will be deployed.

In this example, the introduction of four geolocation nodes 30a-30d can provide nine different overlap areas 43 together covering substantially the entire wireless network area 16. When the geolocation nodes 30 are configured to communicate with the wireless network 12 and to attach to commonly available power outlets, the installation overhead can be extremely low. Because the geolocation nodes 30 primarily operate in a receiving mode, their reception patterns may be comparable to the reception zones 41 provided by the wireless routers 14, the reception zones 41 being determined primarily by the power of the mobile wireless device 18 during reception.

Figure 6:
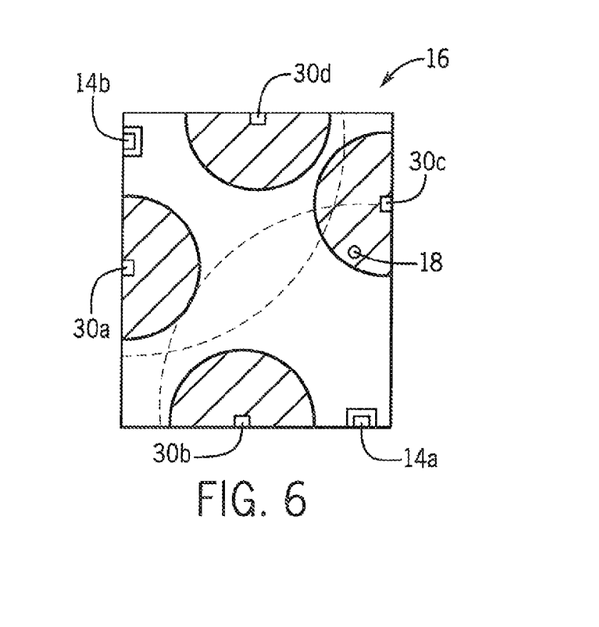
FIG. 6 is a figure similar to that of FIG. 4 showing geolocation node transmission coverage for providing localized transmission.

Referring now to FIG. 6, in one embodiment the geolocation nodes 30 may also provide for transmission of data to the portable devices 18. Again this function is, at first glance, duplicative of the wireless routers 14; however, in this case the geolocation nodes 30 may be limited in transmission power to provide a transmission zone 53 much smaller than the reception zones 41 (and the transmission regions) of the wireless routers 14. This allows localized transmission of data to the mobile wireless devices 18 without the need to identify (uniquely or otherwise) a particular mobile wireless device 18. That is, the reduced power transmission provided by the geolocation nodes 30 allows information to be transmitted to an individual 22 based on their location without knowing the location of the individual 22.

The present invention therefore contemplates providing the individual 22 with different levels of security depending on a preference and permissions granted by the individual 22. At a level of total anonymity, the individual 22 may receive information from the geolocation nodes 30 within the transmission zones 52 that are limited, and thus relevant, to the particular location of the individual 22. This information is provided without the need for the individual 22 to reveal his or her location or even existence within that zone 53.

At a second near-anonymity level, the location of the individual 22 is determined by signal-based location using the non-personal information of the transmitter MAC address, and the MAC address is encrypted as discussed above for maximum privacy and then erased.

Figure 7:
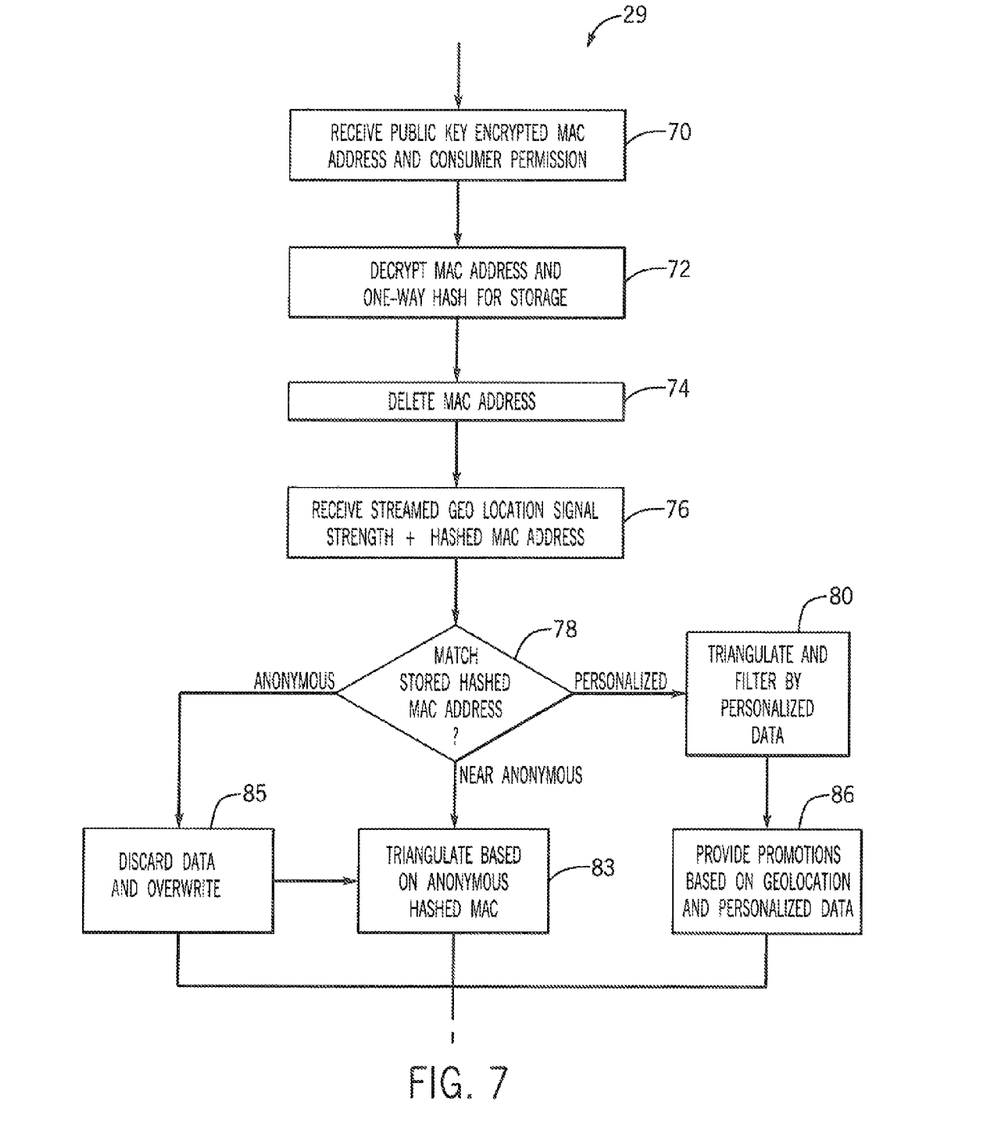
FIG. 7 is a flowchart executed by a server receiving information from the geolocation node of FIG. 1 for providing three levels of privacy control.

Referring now to FIG. 7, the invention also contemplates that the individual 22 may grant permission to track his or her location and link that location to personally identifiable information (for example, gender or buying preferences). This level of privacy requires that the individual 22 send their MAC address to the server 29 (not through the geolocation nodes 30 but by an independent channel). The server 29 may then perform a one-way hash on that MAC address to match it with the received one-way hash MAC addresses in order to make this identification.

Specifically, in the event that proper consumer permission has been provided to make use of personally identifiable information in geolocation, for example to receive offers and promotions, an application program operating on the mobile wireless device 18 may forward to the server 29 a public-key encrypted MAC address and consumer permission authentication as indicated by process block 70. The consumer permission authentication may require that the permission be received from an authorized device under the control of the user and be accompanied with a consumer entered password or the like. As is understood in the art, the public key encryption allows all application programs (and others having knowledge of the public key) to encrypt but not decrypt transmitted MAC address.

At process block 72 the server 29 may decrypt the MAC address and perform a one-way hash of the type performed by the geolocation nodes 30. The hashed Mac address is stored in a table 73 (shown in FIG. 1) in a record linked to the individual 22 and a desired level of Consumer privacy being one of "anonymous", "near-anonymous", and "personalized". Again immediately after the hashing process, the MAC address is erased per process block 74.

During normal signal-based location operations, the server 29 will then receive a stream of geolocation signals providing signal parameters such as signal strength linked to hashed MAC addresses. These geolocation signals will be from multiple mobile wireless devices 18 and from multiple geolocation nodes 30 receiving signals from a single mobile wireless device 18. General receipt of the signals is indicated by process block 76.

At decision block 78, the one-way hashed MAC addresses are compared against the above described table 73 of the one-way hash MAC addresses created at process block 72 and associated with individual consumers and permission levels. If there is a match, as detected at decision block 78, then the program proceeds to one of process blocks 85, 83, and 80 depending on whether the permission level associated with the hashed MAC address was "anonymous", "Dear-anonymous", or "personalized".

At the highest level of anonymity ("anonymous"), the geolocation data is discarded and overridden as indicated by process block 85. Although the data was transmitted by the geolocation nodes 30 (a necessary feature of providing no personal information at the geolocation nodes 30) the hash of the MAC address and its rapid deletion provides high privacy levels to the individual 22.

At a "near-anonymous" level as indicated by process block 83, the hashed MAC address is used to perform signal-based location but the signal-based location is not identified to a particular individual 22. In this case the table 73 may only indicate a privacy level and a link to the individual 22 may be simply the hashed MAC address with no personally identifiable information.

At a "personalized" privacy level, the hashed MAC addresses are used to perform signal-based location as per process block 83 and the geolocation data may be filtered by the personalized data provided by the individual 22, for example, to provide improved marketing understanding of the geolocation data. At process block 86, the individual 22 may be provided with promotions based on the geolocation data (the location of the individual 22) and the personalized data. For example, these promotions may provide coupons for products near the individual 22 according to indicated consumer preferences.

In the event that an individual 22 wishes to prevent their encrypted (hashed) MAC address from being transmitted by the geolocation nodes 30 at all, the individual will enter their MAC address into a form on a web site. The geolocation node 30 will maintain a blacklist of such excluded MACs against which it will check each MAC prior to encryption. This blacklist may be stored in hashed form and may be downloaded in hashed from the wireless router 14 to the geolocation nodes 30. Should a blacklisted device be matched, then this MAC will be immediately deleted 74 and not transmitted. Alternatively, the blacklist may be maintained by wireless router 14 to similar effect.

Figure 8:
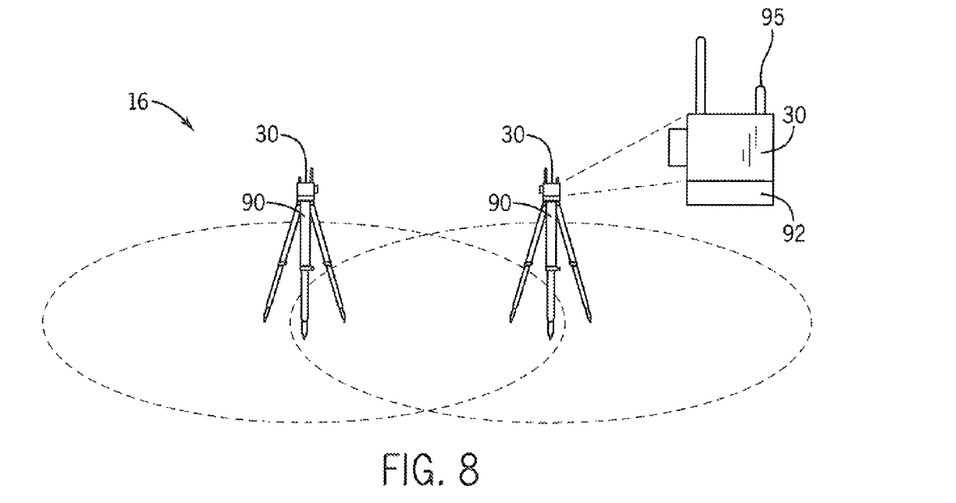
FIG. 8 is a simplified perspective view of the wireless nodes of FIG. 1 installed in a temporary venue.

Referring now to FIG. 8, the present geolocation nodes 30, having limited functionality, may be readily deployed in temporary situations, for example at trade shows or the like, by supporting individual geolocation nodes 30 on a stand 90 freely relocatable about an area. In this case, the geolocation node 30 may include a battery pack 92 and a second transceiver 95, for example, providing for mesh network interconnectivity, using ZigBee or the like, to an Internet connection. The resulting system provides a low-cost and easily installed geolocation platform.

Figure 9:
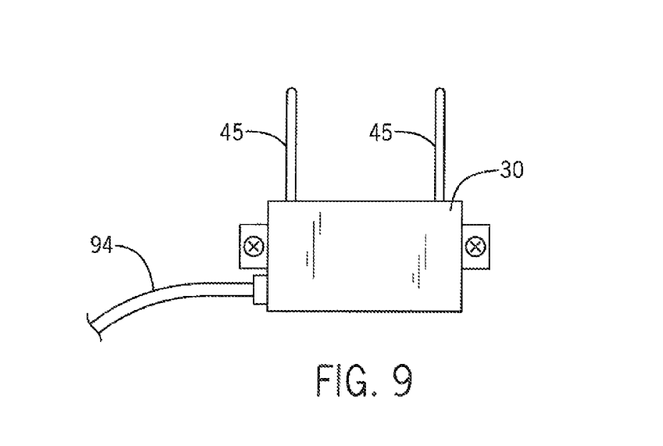
FIG. 9 is a front elevational view of an alternative embodiment of the geolocation node having a wired connection.

Referring to FIG. 9, it will be appreciated that the geolocation nodes 30 may also include a wired Ethernet connection 94 using an Ethernet interface on the computer 40 shown in FIG. 2 for more permanent installations and that the Ethernet connection 94 may deliver power to the device under power over Ethernet standards. It will also be appreciated that multiple wireless antennas 45 may be employed associated with different radio transmission channels or protocols, for example, to provide interference-free communication with server 29 while monitoring devices 18 to provide reception angle information.

As used herein, the term "geolocation" refers to a geolocation that does not require GPS access.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The teens "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood depending on context to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A geolocation node comprising:
a wireless receiver;
a processor executing a stored program to:
(1) receive via the wireless receiver wireless signals from local, mobile wireless devices and record a wireless signal strength of each received signal linked to an identification of a given wireless device;
(2) provide one-way encryption of the identification of the given wireless device, the one-way encryption providing an encrypted identifier that cannot be used to identify the given wireless device but that allows signals from the given mobile wireless device, to be linked to a common but unidentified mobile wireless device; and
(3) transmit linked wireless signal strength and encrypted identification of the given wireless device over a network connection to a signal-based location computer.

2. The geolocation node of claim 1 wherein the identification of the wireless device is a media access control (MAC) address.

3. The geolocation node of claim 1 wherein the program further overwrites the identification of the mobile wireless device after one-way encryption of the identification of the mobile wireless device.

4. The geolocation node of claim 1 wherein the geolocation node is functionally blocked from transmitting unencrypted identification of the mobile wireless device.

5. The geolocation node of claim 1 wherein the program stores the identification of the mobile wireless device for processing only in volatile memory.

6. The geolocation node of claim 1 wherein the stored program is functionally blocked from storing wireless payload data received from the mobile wireless device.

7. The geolocation node of claim 1 further including a blacklist table and wherein the stored program operates to prevent transmission of any data based on an identifier of the mobile wireless device.

8. A geolocation node comprising:
a wireless receiver:
a processor executing a stored program to:
(1) receive via the wireless receiver wireless signals from local, mobile wireless devices and record a wireless signal strength of each received signal linked to an identification of a given wireless device;
(2) provide one-way encryption of the identification of the given wireless device; and
(3) transmit linked wireless signal strength and encrypted identification of the given wireless device over a network connection to a signal-based location computer,
wherein the geolocation node includes an electrical connector for receiving line voltage AC from a releasable AC power connector wherein the AC power connector physically supports the geolocation node on the releasable AC power connector.

9. The geolocation node of claim 8 wherein the electrical connector is adapted to connect to a releasable AC power connector selected from the group consisting of an electrical outlet and a light socket.

10. The geolocation node of claim 8 further including a housing openable for access to the processor and providing an electrical connector for receiving electrical power for the processor, wherein the housing is adapted to open only when the electrical connector is disconnected from electrical power.

11. A geolocation system comprising:
a first wireless network system of a first number of spatially separated first wireless transceivers having a first functionality, the first wireless network providing data exchange with mobile wireless devices in a first connectivity area;
a second wireless network system of a second number of spatially separated second wireless receivers greater than the first number of spatially separated first wireless transceivers having a second functionality omitting functions of the first functionality, the omitted functions being the re-transmission of data from the mobile wireless devices other than an encrypted identification of a given mobile wireless device, the second wireless network providing data reception from mobile wireless devices in a first connectivity area;

wherein the second wireless receivers further include transmitters providing data transmission to mobile wireless devices in the first connectivity area over a combined transmission area substantially less than the first connectivity area;

wherein each second wireless receiver includes a processor executing a stored program to:

(1) receive via the wireless receiver wireless signals from local mobile wireless devices and record a wireless signal strength of each received signal linked to an identification of a given mobile wireless device;

(2) provide encryption of the identification of the given mobile wireless device;

(3) transmit the linked wireless signal strength and encrypted identification of the given mobile wireless device over a network connection to a triangulating computer.

12. The geolocation system of claim 11 wherein the second wireless network provides data exchange with mobile devices substantially only in the first connectivity area.

13. The geolocation system of claim 12 wherein transmission areas of the transmitters of the second wireless receivers are substantially disjoint.

14. The geolocation system of claim 12 wherein the wireless receivers transmit the wireless signal strength and encrypted identification of the given mobile wireless devices by means of the first wireless network system.

* * * * *

UNITED STATES PATENT AND TRADEMARK OFFICE
CERTIFICATE OF CORRECTION

PATENT NO. : 9,241,321 B2
APPLICATION NO. : 13/959908
DATED : January 19, 2016
INVENTOR(S) : Joe Barneson et al.

It is certified that error appears in the above-identified patent and that said Letters Patent is hereby corrected as shown below:

IN THE CLAIMS

Col. 10, Line 61, Claim 11

Delete "haying" and substitute therefor --having--

Signed and Sealed this
Twenty-fourth Day of May, 2016

Michelle K. Lee
*Director of the United States Patent and Trademark Office*